US011886532B1

(12) United States Patent
Gebov et al.

(10) Patent No.: US 11,886,532 B1
(45) Date of Patent: Jan. 30, 2024

(54) TECHNOLOGY AGNOSTIC PAGE BUILDER ARCHITECTURE

(71) Applicant: Progress Software Corporation, Bedford, MA (US)

(72) Inventors: Martin Gebov, Sofia (BG); Vladimir Vasilev, Sofia (BG); Lilia Messechkova, Sofia (BG)

(73) Assignee: PROGRESS SOFTWARE CORPORATION, Burlington, MA (US)

( * ) Notice: Subject to any disclaimer, the term of this patent is extended or adjusted under 35 U.S.C. 154(b) by 44 days.

(21) Appl. No.: 17/681,473

(22) Filed: Feb. 25, 2022

Related U.S. Application Data

(63) Continuation of application No. 17/308,735, filed on May 5, 2021, now Pat. No. 11,263,387.
(Continued)

(51) Int. Cl.
*G06F 16/958* (2019.01)
*G06F 40/143* (2020.01)
(Continued)

(52) U.S. Cl.
CPC .......... *G06F 16/958* (2019.01); *G06F 40/103* (2020.01); *G06F 40/143* (2020.01); *G06F 40/166* (2020.01)

(58) Field of Classification Search
CPC .... G06F 40/143; G06F 40/166; G06F 16/958; G06F 40/103
See application file for complete search history.

(56) References Cited

U.S. PATENT DOCUMENTS 6,751,778 B1 * 6/2004 Broman ............... G06F 40/10
715/205
7,409,710 B1 * 8/2008 Uchil ................... H04L 63/08
726/19
(Continued)

OTHER PUBLICATIONS

Messechkova, Lilia, Moving Toward a Decoupled CMS with .NET Core in Sitefinity, Web Experience Blog, https://www.progress.com/blogs/moving-toward-a-decoupled-cms-with-.net-core-in-sitefinity, Aug. 28, 2019, 2pgs.
(Continued)

*Primary Examiner* — Asher D Kells
(74) *Attorney, Agent, or Firm* — PATENT LAW WORKS LLP

(57) ABSTRACT

A system and method for technology agnostic page editing and/or rendering that includes receiving a first modification request associated with a first page, the first modification request generated by an agnostic page editor, the agnostic page editor compatible with a plurality of renderers from which an administrative user identifies a first set of renderers to be associated with the first page; modifying a first meta model associated with the first page based on the first modification request, the first meta model using a data interchange format; obtaining, by a first renderer belonging to the first set of renderers, the meta model associated with the first page; rendering, by the first renderer belonging to the first set of renderers, the first page for presentation to the administrative user using the first meta model; and sending first rendered content for presentation of the first page.

20 Claims, 5 Drawing Sheets

Related U.S. Application Data

(60) Provisional application No. 63/020,271, filed on May 5, 2020.

(51) Int. Cl.
*G06F 40/103* (2020.01)
*G06F 40/166* (2020.01)

(56) References Cited

U.S. PATENT DOCUMENTS

| | | | | |
|---|---|---|---|---|
| 2003/0225829 | A1* | 12/2003 | Pena | G06F 16/957 707/E17.119 |
| 2008/0155396 | A1* | 6/2008 | Dubinko | G06F 16/9577 715/251 |
| 2009/0222469 | A1* | 9/2009 | Maillot | G06T 15/04 |
| 2010/0023852 | A1* | 1/2010 | Chou | G06F 40/186 715/234 |
| 2014/0019847 | A1* | 1/2014 | Osmak | G06F 40/186 715/234 |
| 2017/0031574 | A1* | 2/2017 | Dhawal | G06F 40/186 |

OTHER PUBLICATIONS

Maffei, David, "Beheading SharePoint (and Office 365)—the hype around 'headless'", https://community.akumina.com/beheading-sharepoint-and-office-365-the-hype-around-headless-content-management-and-site-delivery-2/, published Aug. 18, 2017, 6 pgs.

"Gatsby Tutorial #1—What is a Static Site Generator?", https://www.youtube.com/watch?v=Qms4k6y7Ogl, Feb. 24, 2021.

"Developing Xperience applications using asp.net Core", Xperience by Kentico, https://docs.xperience.io/developing-websites/developing-xperience-applications-using-asp-net-core, visited Apr. 27, 2021, 2 pgs.

* cited by examiner

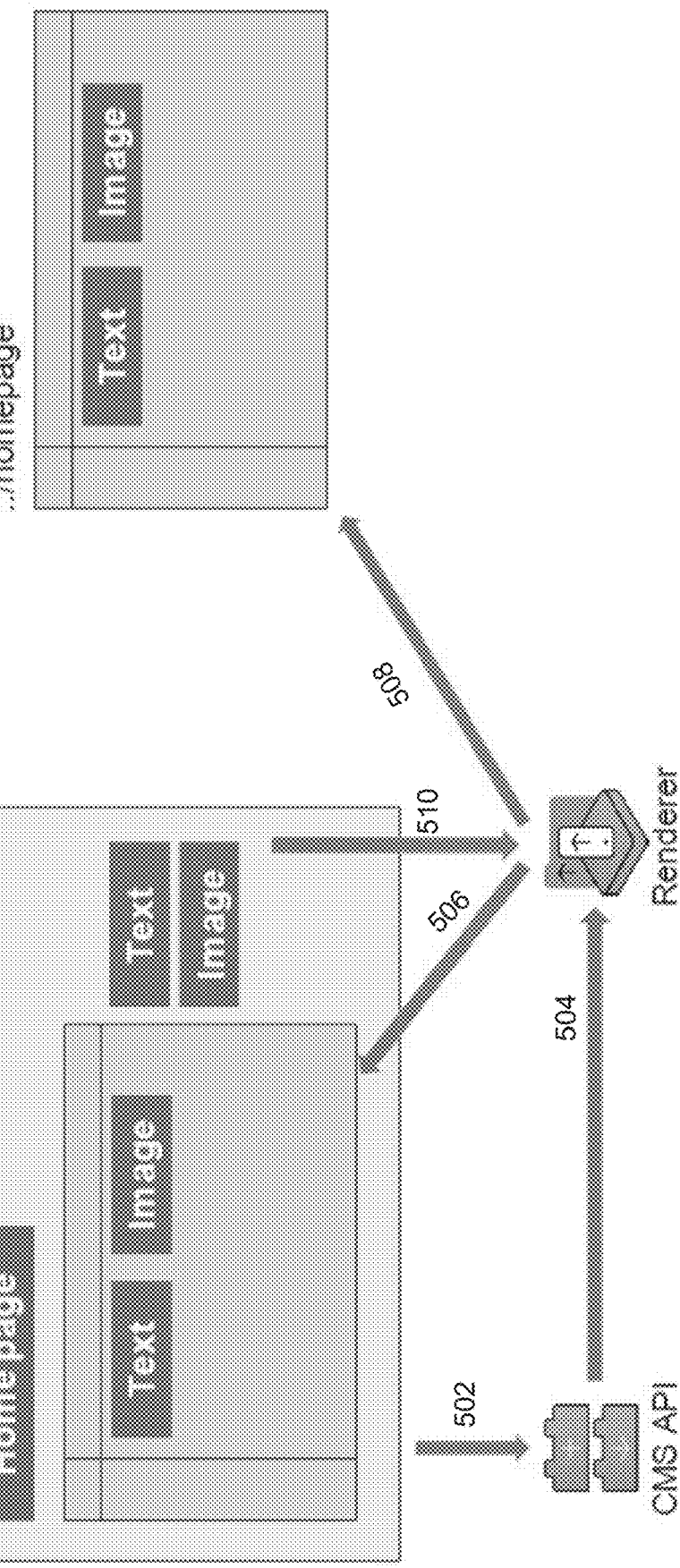

TECHNOLOGY AGNOSTIC PAGE BUILDER ARCHITECTURE

CROSS REFERENCE TO RELATED APPLICATIONS

This application is a continuation of U.S. patent application Ser. No. 17/308,735, titled "Technology Agnostic Page Builder Architecture," filed May 5, 2021, which claims priority under 35 U.S.C. § 119(e) to U.S. Provisional Patent Application No. 63/020,271, titled "Technology Agnostic Page Builder Architecture," filed May 5, 2020. The entire contents of the foregoing is incorporated by reference herein.

FIELD OF INVENTION

The present disclosure relates to the field of content management systems. More specifically, the disclosure relates to building the content presentation layer of a website or other digital channel.

BACKGROUND

New technologies for website development, e.g., web application frameworks, are created and implemented. Implementing a new web application framework, whether entirely new or updated, using previous solutions is time consuming and costly. Furthermore, the time consuming and costly process is repeated, using previous solutions, when the next up-and-coming technology arrives, and so on in perpetuity.

Additionally, certain web application frameworks may provide certain advantages. However, the needs of the website or web application may change over time, and transitioning using previous solutions is time consuming and costly.

Current systems and methods fail to address one or more of these issues.

SUMMARY

This specification relates to methods and systems for technology agnostic page editing and rendering. According to one aspect of the subject matter described in this disclosure, a method includes receiving, using one or more processors, a first modification request associated with a first page, the first modification request generated by an agnostic page editor responsive to input received from an administrative user, the agnostic page editor compatible with a plurality of renderers from which the administrative user identifies a first set of renderers to be associated with the first page; modifying, using the one or more processors, a first meta model associated with the first page based on the first modification request, the first meta model using a data interchange format and representing a content and a layout of the first page; obtaining, by a first renderer belonging to the first set of renderers, subsequent to modification, the meta model associated with the first page, the first renderer belonging to the first set of renderers associated with the first page; rendering, by the first renderer belonging to the first set of renderers, the first page for presentation to the administrative user using the first meta model; and sending first rendered content for presentation of the first page to the administrative user via the agnostic page editor.

In general, another aspect of the subject matter described in this disclosure includes a system comprising one or more processors and memory operably coupled with the one or more processors, wherein the memory stores instructions that, in response to the execution of the instructions by one or more processors, cause the one or more processors to perform the operations of receive a first modification request associated with a first page, the first modification request generated by an agnostic page editor responsive to input received from an administrative user, the agnostic page editor compatible with a plurality of renderers from which the administrative user identifies a first set of renderers to be associated with the first page; modify a first meta model associated with the first page based on the first modification request, the first meta model using a data interchange format and representing a content and a layout of the first page; obtain by a first renderer belonging to the first set of renderers, subsequent to modification, the meta model associated with the first page, the first renderer belonging to the first set of renderers associated with the first page; render, by the first renderer belonging to the first set of renderers, the first page for presentation to the administrative user using the first meta model; and send first rendered content for presentation of the first page to the administrative user via the agnostic page editor.

Other implementations of one or more of these aspects include corresponding systems, apparatus, and computer programs, configured to perform the actions of the methods, encoded on computer storage devices.

These and other implementations may each optionally include one or more of the following features. For instance, the first modification request includes at least one of: a request to create the first page, a request to modify one or more of the layout associated with the first page and the content associated with the first page, where the request to modify the content associated with the first page includes: a modification including one or more of an addition, a removal, and a change, and the content includes one or more of text, an image, and a widget; and a request to remove a renderer from the first set of renderers. For instance, the first modification request includes a request to add the first renderer to the first set of renderers. For instance, modifying the first meta model associated with the first page is performed via a first set of content management system application program interface calls, and the agnostic page editor is a what-you-see-is-what-you-get page editor. For instance, the first set of renderers associated with the first page includes one or more of a set of client-side renderers and a set of server-side renderers. For instance, the first set of renderers associated with the first page includes multiple, different renderers, and the first page is rendered for presentation to multiple visitors using the multiple, different renderers in parallel. For instance, the features may include: receiving a first request to view the first page, the first request to view the first page associated with a visitor; obtaining the first page meta model rendering, using a renderer identified from the first set of renderers associated with the first page, the first page for presentation to the first user based on the first meta model associated with the first page; and sending second rendered content for presentation to the visitor via a browser. For instance, the features include one or more of: the data interchange change format includes JSON; the first rendered content includes one or more of HTML, and Windows Forms data; and the second rendered content includes one or more of HTML and Windows Forms data. For instance, the features include identifying which render, from the first set of renderers, to use to obtain the first meta model and render the first page based on one or more information associated with a request, information associated with a client from which the request was received, and a domain.

BRIEF DESCRIPTION OF THE DRAWINGS

The disclosure is illustrated by way of example, and not by way of limitation in the figures of the accompanying drawings in which like reference numerals are used to refer to similar elements.

FIG. 5 is diagram of an example workflow for technology-agnostic page building according to one embodiment.

DETAILED DESCRIPTION

New technologies for website development, e.g., web application frameworks, continue to be created and implemented. Examples of web application frameworks include, but are not limited to ASP.Net Web Forms, ASP.Net MVC, Angular, ASP.Net MVC Core. Vendors, e.g., CMS Vendors, may update their technology stack to utilize newer web application frameworks to stay relevant and competitive. However, implementing a new web application framework, whether entirely new or updated, using prior solutions is often time consuming and costly. For example, using previous solutions, it may have taken over a year to refactor a page builder and to rewrite out-of-the-box widgets and designers originally developed to support ASP.Net Web Forms to support ASP.Net MVC. Writing migration scripts and rewriting custom widgets and custom designers for an individual web application may have added months to the process timeline. The process would then be repeated later to support the next up-and-coming technology (e.g. ASP.Net MVC Core), and so on in perpetuity.

Additionally, certain web application frameworks may provide certain advantages. For example, frameworks focused on the server-side functionality, such as .NET Core, are more suitable for websites with a considerable volume of page views where page load speed is a critical factor, while client-side focused technologies, such as Angular, may be preferred for websites having lots of functionality that allows for user interaction on the frontend. However, the needs of the website or web application may change over time, and transitioning using previous systems and methods is time consuming.

The technology-agnostic page builder described herein addresses one or more of the foregoing issues.

Figure 1:
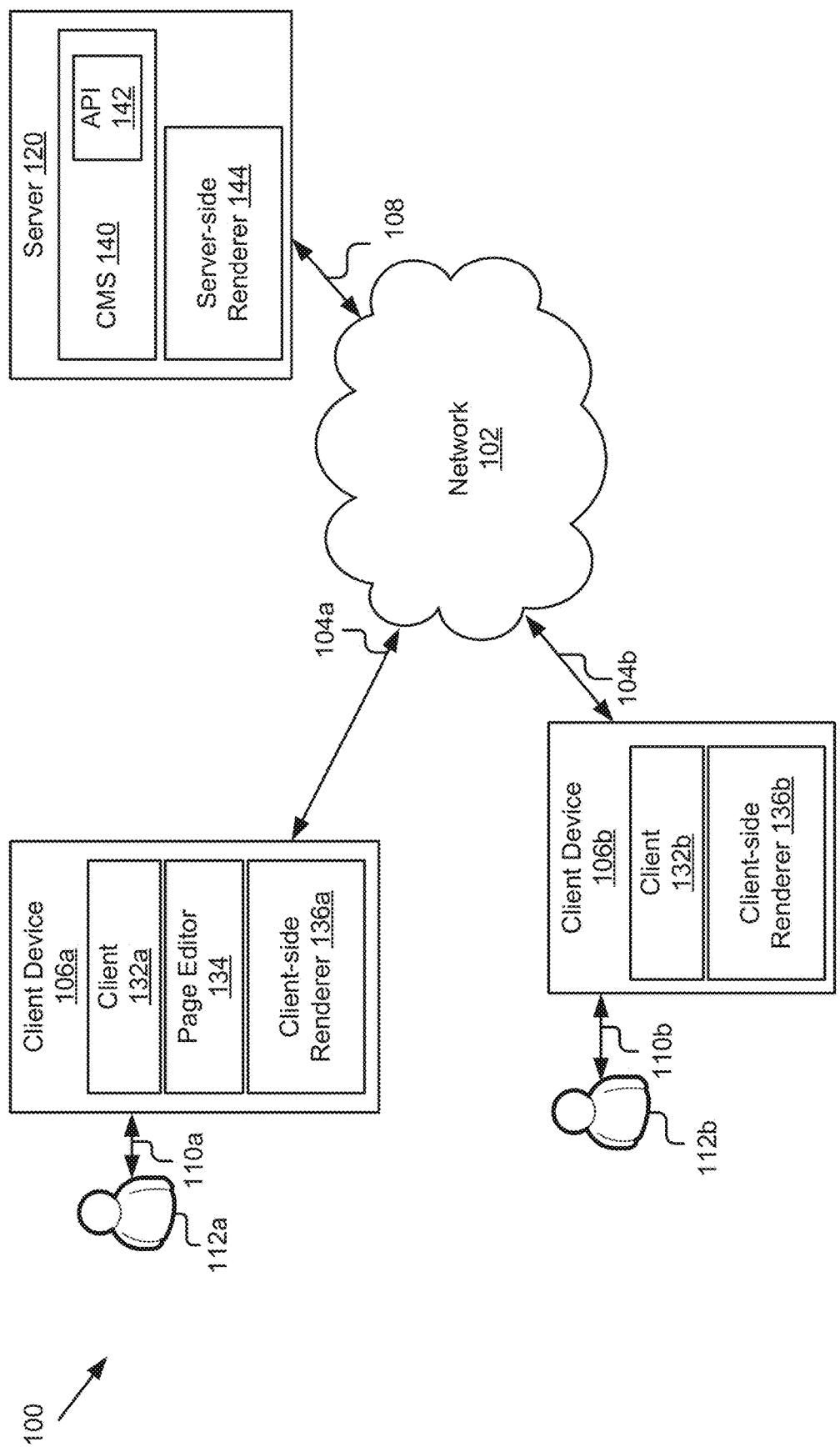
FIG. 1 is a block diagram illustrating an example system for a technology-agnostic page builder according to one embodiment.

FIG. 1 is a block diagram illustrating an example system 100 for a technology-agnostic page builder according to one embodiment. The illustrated system 100 includes client devices 106a and 106b and a server 120, which are communicatively coupled via a network 102 for interaction with one another. For example, the client devices 106a and 106b (also referred to collectively as client devices 106) may be coupled to the network 102 via signal lines 104a and 104b, respectively, and may be accessed by users 112a and 112b (also referred to collectively as users 112), respectively, as illustrated by lines 110a and 110b, respectively, and the server 120 may be coupled to the network 102 via signal line 108.

For clarity and convenience, the user 112a as an administrative user and user 112b is referred to as a visitor. Additionally, for clarity and convenience, the description herein describes a single administrative user 112a and a single visitor 112b. However, it should be recognized that the system 100 may include multiple administrative users 112a and/or multiple visitors 112b. For example, the multiple administrative users (not shown) may build one or more pages using the technology-agnostic page editor 134, and multiple visitors (not shown) may visit (using the same or different client devices) a single page or multiple pages created using the technology-agnostic page editor 134 as described herein.

The network 102 may include any number of networks and/or network types. For example, the network 102 may include, but is not limited to, one or more local area networks (LANs), wide area networks (WANs) (e.g., the Internet), virtual private networks (VPNs), mobile networks (e.g., the cellular network), wireless wide area network (WWANs), Wi-Fi networks, WiMAX® networks, Bluetooth® communication networks, peer-to-peer networks, other interconnected data paths across which multiple devices may communicate, various combinations thereof, etc. Data transmitted by the network 102 may include packetized data (e.g., Internet Protocol (IP) data packets) that is routed to designated computing devices coupled to the network 102. In some implementations, the network 102 may include a combination of wired and wireless (e.g., terrestrial or satellite-based transceivers) networking software and/or hardware that interconnects the computing devices of the system 100. For example, the network 102 may include packet-switching devices that route the data packets to the various computing devices based on information included in a header of the data packets.

The data exchanged over the network 102 can be represented using technologies and/or formats including the Hypertext Markup Language (HTML), the Extensible Markup language (XML), JavaScript Object Notation (JSON), YAML Ain't Markup Language (YAML), Electronic Data Interchange (EDI) including those in the EDI-FACT and X12 families, ACORD/AL3, various National Council for Prescription Drug Programs (NCPDP) standards, Comma Separated Values (CSV), etc. In addition, all or some data can be encrypted using conventional encryption technologies, for example, the secure sockets layer (SSL), Secure HTTP (HTTPS) and/or virtual private networks (VPNs) or Internet Protocol security (IPsec). In another embodiment, the entities can use custom and/or dedicated data communications technologies instead of, or in addition to, the ones described above. Depending upon the embodiment, the network 102 can also include links to other networks.

The client devices 106 are computing devices having data processing and communication capabilities. While FIG. 1 illustrates two client devices 106, as previously mentioned, the present description applies to any system architecture having one or more client devices 106. In some embodiments, a client device 106 may include a processor (e.g., virtual, physical, etc.), a memory, a power source, a network interface, and may include other components whether software or hardware, such as a display, graphics processor, wireless transceivers, keyboard, camera, sensors, firmware, operating systems, drivers, various physical connection interfaces (e.g., USB, HDMI, etc.). The client devices 106a and 106b may couple to and communicate with one another and the other entities of the system 100 via the network 102 using a wireless and/or wired connection.

Examples of client devices 106 may include, but are not limited to, mobile phones (e.g., feature phones, smart phones, etc.), tablets, laptops, desktops, netbooks, server appliances, servers, virtual machines, TVs, set-top boxes, media streaming devices, portable media players, navigation devices, personal digital assistants, etc. While two or more client devices 106 are depicted in FIG. 1, as previously mentioned, the system 100 may include any number of client devices 106. In addition, the client devices 106a and 106b may be the same or different types of computing devices. The client 132a/132b may be storable in a memory and executable by a processor of a client device 106a/b.

In the illustrated embodiment, the client device 106a, used by an administrative user 112a, includes a client 132a, a page editor 134 and a client-side renderer 136a. In one embodiment, the client 132a is a web client (e.g. a web browser such as Mozilla Firefox, Google Chrome, Microsoft Internet Explorer, Opera, Safari, etc.). In another example, the client 132a is a mobile client (e.g. that works on one or more of Android, iOS, Windows 8, Blackberry, or any other mobile operating system). In another example, the client 132a is a desktop client (e.g. that works on a Windows, Mac, Linux, or any other operating system).

Page editor 134 edits web pages based on input received from an administrative user 112a. In one embodiment, the page editor 134 includes a what you see is what you get (WYSIWYG) user interface, which enables non-technical administrative users, such as marketers, to design how and where content is displayed on a page with the help of widgets from the toolbox. In one embodiment, the page editor 134 is technology-independent, also referred to herein as agnostic. For example, in one embodiment, the page editor 134 provides a single user interface (UI) and allows an administrative user 112a to build and/or edit a page independent of the technology (e.g. .Net Core or Angular) that the page(s) use (e.g. to be rendered), and allows the user 112a to select one or more of the technologies. For example, an administrative user 112a may build a website and may select to implement the pages using .Net Core. The administrative user 112a may later elect, using the page editor 134, to implement the pages (or a subset thereof) using Angular without recreating the pages.

In some embodiments, the page editor 134 is accessed via the client 132a, and the page(s) being edited are rendered in the client 132a. The page editor 134 is communicatively coupled to the Content Management System (CMS) 140 using the CMS Application Program Interface (CMS API) 142 and one or more of the client-side renderer 136a and a server-side renderer 144. Below are some example operations associated with the page editor 134.

| Example Page Designer/Editor 134 Internal Operations | | | |
|---|---|---|---|
| Operation | Input | Output | Comment |
| Load page html into iframe | page url | page html | Specifies the URL of the iframe for editing. The URL points to the renderer(s) which returns the page html with meta data needed for editing. |
| Load widgets | | list of widgets | Requests the list of widgets supported by the renderer(s) |
| Add widget | widget name widget properties | page html | Adds a new widget to the page and calls the CMS API to persist the changes. Then makes a call to the renderer(s) to refresh the page html. |
| Edit Widget | widget name widget properties | page html | Calls the renderer(s) to obtain the widget properties, then calls the CMS API to obtain their values. Based on this data generates UI for widget property editing. Once changes are made calls the CMS API to persist the them. Then makes a call to the renderer(s) to refresh the page html. |
| Remove widget | widget name | page html | Removes a widget from the page and calls the CMS API to persist the changes. Then makes a call to the renderer(s) to refresh the page html. |

A renderer may include code and routines for generating an image for presentation to a user 112. The page(s) being built and edited via the page editor 134, are rendered for presentation to the administrative user 112a via client device 106a. In one embodiment, the page(s) are subsequently accessed by a visitor 112b and rendered for visual presentation to the visitor via client device 106b.

Depending on the implementation, the renderer(s) used may vary. In one embodiment, the administrative user 112a selects a set of renderer(s) used, and the renderer may vary based on the selection of an administrative user 112a. For example, an administrative user 112a may select to render the pages using a client-side technology (e.g. Angular) to provide a richer user experience for visitors, and the page editor 134 communicates with and uses a client-side renderer 136a (an Angular renderer in this example) to present the page(s) to the administrative user 112a during page editing. Later, the client-side renderer 136b (an Angular renderer in this example) is used to present the page(s) to a visitor. In one embodiment, the renderer(s) may vary over time. For example, continuing the previous example, the administrative user 112a may subsequently indicate that the page(s) are to be rendered server-side (e.g. .Net Core renderer) moving forward. Alternatively, the administrative user 112a may select multi-channel rendering. Depending on the type of multi-channel rendering a page may be rendered using multiple renderers (e.g. multiple client-side renderers, multiple server-side renderers, or a mix including a client-side renderer and a server-side renderer) or different pages maybe rendered using different sets of one or more renderers. In one embodiment, a page may be rendered simultaneously by two or more renderers, but a first renderer does not render only a first portion of a page and while a second renderer renders only a second, remaining portion of that same page.

In the illustrated embodiment, the client device 106b, used by a visitor, includes a client 132b, and a client-side renderer 136b. In one embodiment, the client 132b is a web client (e.g. a web browser such as Mozilla Firefox, Google Chrome, Microsoft Internet Explorer, Opera, Safari, etc.). In another example, the client 132b is a mobile client (e.g. that works on one or more of Android, iOS, Windows 8, Blackberry, or any other mobile operating system). In another example, the client 132b is a desktop client (e.g. that works on a Windows, Mac, Linux, or any other operating system).

It should be recognized that the clients 132a and 132b may be different instances of the same client (e.g. two instances of Google Chrome), different clients of a similar type (e.g. a Google Chrome and Mozilla Fire Fox web clients), or different types of clients (e.g. client 132a is a web client and client 132b is a mobile client). For clarity and convenience, the description herein is described with reference to the clients 132a and 132b being web clients, also referred to as a "browser" or similar.

As discussed above, the administrative user 112a may identify which technology, or technologies, to use when build the page(s) using the page editor 134. When the page(s) are designed for a client-side rendering technology (e.g. Angular), the client-side renderer 136b renders page(s) for presentation to a visitor 112b via client device 106b. While two instances 136a and 136b of a client-side renderer (e.g. two instances of an Angular renderer) are illustrated. It should be recognized that the system 100 may include multiple client-side renderers. For example, N client-side renderers on client-device 106a to render pages being built using the various N technologies, and N client-side renderers on client device 106b to render those pages for presentation to a visitor 112b.

The server 120 may include one or more computing devices having data processing, storing, and communication capabilities. For example, the server 120 may include one or more hardware servers, server arrays, storage devices, systems, etc., and/or may be centralized or distributed/cloud-based. In some implementations, the server 120 may include one or more virtual servers, which operate in a host server environment and access the physical hardware of the host server including, for example, a processor, memory, storage, network interfaces, etc., via an abstraction layer (e.g., a virtual machine manager).

In the illustrated embodiment, the server 120 includes a CMS API 142 and a server-side renderer 144. As described above, the administrative user 112a may identify which technology, or technologies, to use when build the page(s) using the page editor 134. When the page(s) utilize a technology that implements server-side rendering, the server-side renderer 144 renders the page(s) for presentation to the user 112a/112b. While one instance 144 of a server-side renderer is illustrated. It should be recognized that the system 100 may include multiple server-side renderers and support multiple server-side rendering technologies.

As background, there are three types of content management systems on the market. The first type is the traditional CMS like WordPress, Drupal and Joomla, Kentico, Sitecore, and EpiServer. In this first type, users create and edit their content via tools such an HTML editor and save it to the backend database, the CMS displays the content according to the frontend delivery layer built into the CMS. The second type of CMS systems are headless systems that provide content APIs only. In this second type, the presentation layer of the website is built by developers via code rather than via the UI, as with the first type of CMS systems. Some of the traditional CMS systems, such as Sitecore, have headless elements, whereas others, such as Kentico, have a dedicated headless offering. The third type of CMS systems naturally evolved to meet the current requirements of the market and thus is a combination of headless systems and decoupled page design frameworks.

While the CMS API 142 described herein satisfies the definition of the third type—a decoupled CMS system, it goes a step further. Generally, conventional decoupled CMS systems have a presentation layer bound to a specific technology and the page designer and page renderer are coupled in a single tool. By contrast, the technology agnostic page editor 134 described herein decouples the page editor 134 from the page renderer 136/144. To simplify and clarify, conventional systems have a 1-to-1 correlation between an editor and renderer, so if one where to build a page using Angular, one would use an Angular-specific editor (not shown) and an Angular-specific renderer, and if one were to use .Net Core, one would use a .Net Core-specific editor (not shown) and a .Net Core-specific renderer. By contrast, the page editor 134, in combination with the CMS API 142, and the renderers 136a, 136b, and 144, allow a single editor/designer, i.e. page editor 134, to build technology-agnostic page(s) and use one or more renderers 136a, 136b, and 144 to implement that page using one or more technologies (i.e. a 1-to-many correlation). In one embodiment, the page editor 134 interacts with the CMS API 142, and the decoupled renderers 136a/b, 144 via APIs.

The CMS API 142 persists the meta model of the pages and exposes the meta model for access via an application programming interface (API). In one embodiment, the content management system API 142 persists the meta model of the pages and exposes the meta model for access via REST API. In one embodiment, the page meta model describes the structure and semantic of a page and, when present, an associated widget, as a widget meta model, in a data interchange format. For example, in one embodiment, the content management system API 142 automatically generates and stores the page meta model of a page built using the page editor 134 in a JSON format. In one embodiment, when a page is associated with a widget, the page meta model includes a widget meta model associated with the widget. Below are some example operations associated with the CMS API 142.

| Example CMS API 142 Public Operations | | | |
|---|---|---|---|
| Operation | Input | Output | Comment |
| Get page meta model | page id | page meta model (JSON) | Returns the page meta model |
| Add widget to meta model | page Id widget name placeholder sibling | status code | Persists the widget in the page |
| Remove Widget from meta model | page Id widget name placeholder sibling | page meta model (JSON) | Removes the widget from the page |
| Get widget values | | list of properties with their values (JSON) | Returns a list of widget property values |
| Save widget values | widgets name properties with values | status code | Persists the values of the widget |

The page renderer(s) 136a, 136b, 144 (depending on the user 112 for whom the page is being rendered and the technology, or technologies, used) reads the page meta model and interprets the page meta model using one or more of a plurality of supported frameworks. For example, an administrative user 112a may specify a server-side technology, such as .NET Core, or a client-side technology, such as Angular, React, Vue, and so on. The page renderer 136a, 136b, 144 renders the page, so that an administrative user 112a may view or edit the page. When a visitor 112b visits the page, the page renderer 136a, 136b, 144 renders the page for display to the visitor 112b.

| Example Renderer 136a, 136b and/or 144 Public Operations | | | |
|---|---|---|---|
| Operation | Input | Output | Comment |
| Render page | page url | page html markup | Renders the page meta model in a web-based format(html) for the end users. |
| Render page for edit | page url | page html markup with metadata | Renders the page meta model in html with additional html metadata (html attributes, comments, json, scripts and other resources) needed for the page to be interactive with the page designer. |
| Update widget html | widget name | html markup | Gets the widget property values from the CMS and apply those to render the widget html. Then updates the widget html with the newly rendered one. |
| Insert widget html | widget name | html markup for edit | Gets the widget property values from the CMS and apply those to render the widget html. |
| Get widgets | | list of widgets (JSON) | Returns list of supported widgets |
| Get widget properties | | list of properties - name, type, values (JSON) | Returns the widget properties |

It should be understood that the system 100 illustrated in FIG. 1 is representative of an example system for a technology-agnostic page builder according to one embodiment and that a variety of different system environments and configurations are contemplated and are within the scope of the present disclosure. For instance, various functionality may be moved between devices (e.g. from a server 120 to a client 106, or vice versa) and some implementations may include additional or fewer computing devices, services, and/or networks, and may implement various functionality client or server-side. Further, various entities of the system 100 may be integrated into a single computing device or system or additional computing devices or systems, etc.

Figure 2:
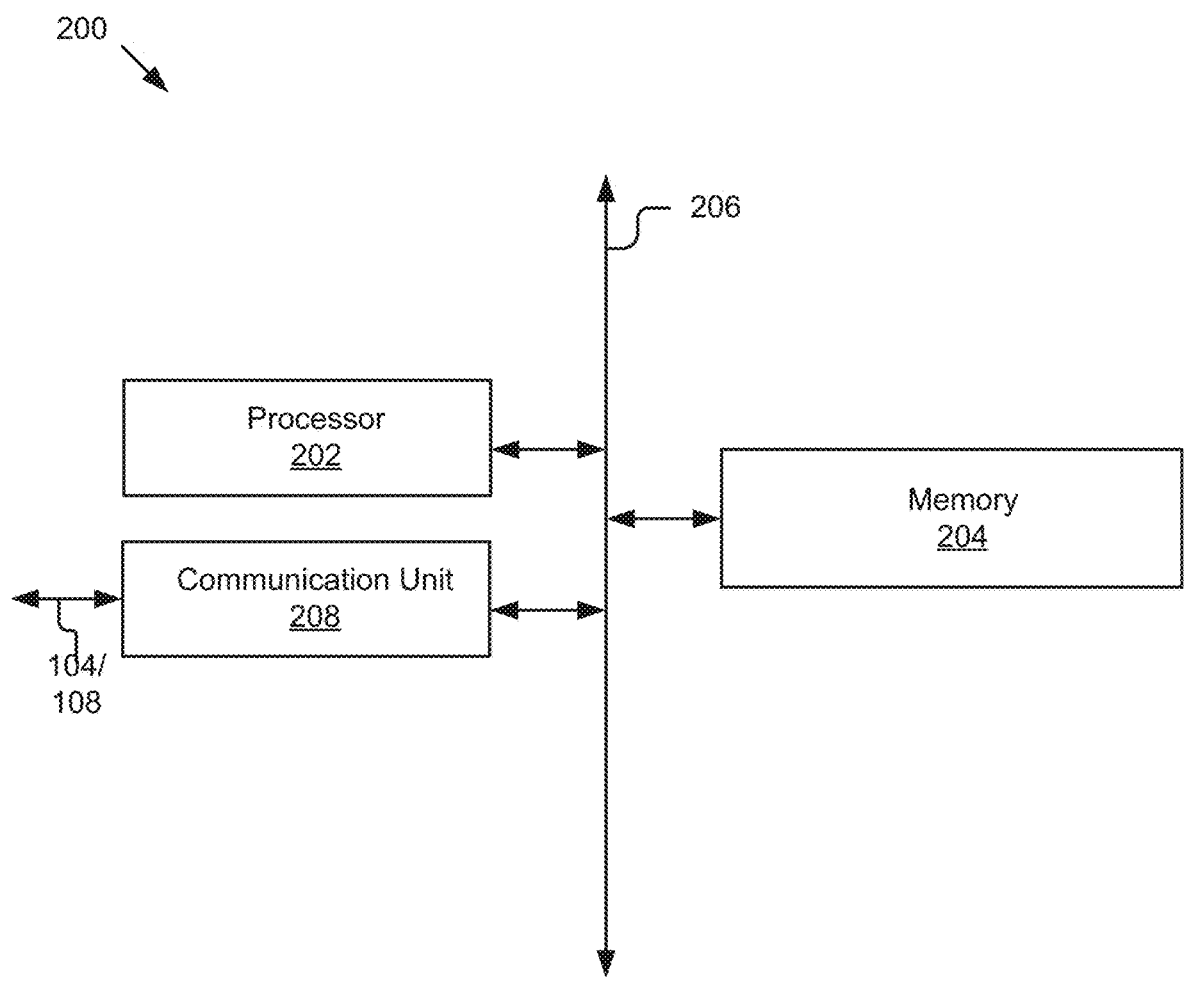
FIG. 2 illustrates an example an example server according to one embodiment.

FIG. 2 illustrates an example computing device 200 according to one embodiment. In one embodiment, a computing device 200 may include a processor 202, a memory 204, and a communication unit 208, which may be communicatively coupled by a bus 206. However, it should be understood that a computing device may take other forms and include additional or fewer components without departing from the scope of the present disclosure. For example, a computing device 200 may include input and output devices (e.g., a display, a keyboard, a mouse, touch screen, speakers, etc.), various operating systems, sensors and other physical configurations.

The processor 202 may execute code, routines and software instructions by performing various input/output, logical, and/or mathematical operations. The processor 202 may have various computing architectures to process data signals including, for example, a complex instruction set computer (CISC) architecture, a reduced instruction set computer (RISC) architecture, and/or an architecture implementing a combination of instruction sets. The processor 202 may be physical and/or virtual, and may include a single core or plurality of processing units and/or cores. In some implementations, the processor 202 may be capable of generating and providing electronic display signals to a display device (not shown), supporting the display of images, capturing and transmitting images, performing complex tasks including various types of feature extraction and sampling, etc. In some implementations, the processor 202 may be coupled to the memory 204 of the computing device 200 via the bus 206 to access data and instructions therefrom and store data therein. The bus 206 may couple the processor 202 to the other components of the computing device 200 including, for example, the memory 204 and communication unit 208.

The memory 204 may store and provide access to data to the other components of the computing device 200. In some implementations, the memory 204 may store instructions and/or data that may be executed by the processor 202. The memory 204 is also capable of storing other instructions and data, including, for example, an operating system, hardware drivers, other software applications, databases, etc. The memory 204 may be coupled to the bus 206 for communication with the processor 202 and the other components of the computing device 200. In one embodiment, the memory 204 of the computing device 200 stores the code and routines that, when executed by the computing device 200 processor 202, perform the functions as described herein.

For example, the functionality described herein with reference to the client device 106a and components thereof (e.g. 132a, 134, and 136a) may be performed when code and routines associated those components (e.g. 132a, 134, and 136a) and stored in the memory 204 of client device 106b is executed by the processor 202 of client device 106a.

For example, the functionality described herein with reference to the client device 106b and components thereof (e.g. 132b and 136b) may be performed when code and routines associated those components (e.g. 132b and 136b) and stored in the memory 204 of client device 106b is executed by the processor 202 of client device 106b.

For example, the functionality described herein with reference to the server 120 and components thereof (e.g. 142 and 144) may be performed when code and routines associated those components (e.g. 142 and 144) and stored in the memory 204 of server 120 is executed by the processor 202 of the server 120.

In one embodiment, the technology-agnostic page editor 134 described herein enables non-technical users/editors 112a, such as marketers and content editors, to create web pages without the need of IT expertise by using the simple drag and drop user interface and predefined widget toolsets. The page editor 134, in one embodiment, is powered by toolsets developed with the help of various technologies including, but not limited to, .NET Core, Angular, React, Vue, and C #Blazor, depending on the purpose of the toolsets and the websites. For example, technologies focused on the server-side functionality, such as .NET Core, are suitable for websites with a considerable volume of page views where page load speed is a critical factor, while client-side technologies, such as Angular, are a preferred choice for websites having lots of functionality that allows for user interaction on the frontend. Thus, based on their requirements, administrative users 112a developing a website can use the page editor 134 to design and produce their website leveraging the benefits of the technology that best suits their needs. However, if their scenario or website goals change, an administrative user 112a can, in one embodiment, interchange the underlying technology (e.g. framework) a website uses by a simple matter of a configuration change on website level using the technology-agnostic page editor 134.

In one embodiment, when the widget toolsets provided by the different technologies support the same functionality, the flexibility of the technology-agnostic page editor 134 allows a page built with a specific technology to be successfully rendered and presented with widgets based on another technology. Additionally, in one embodiment, there is no disruption or change in the way content editors and marketers (i.e. administrative user 112a) work with the technology-agnostic page editor 134 regardless of which technology the page editor 134 is using for a website being built or edited.

The memory 204 includes a non-transitory computer-usable (e.g., readable, writeable, etc.) medium, which can be any apparatus or device that can contain, store, communicate, propagate or transport instructions, data, computer programs, software, code, routines, etc., for processing by or in connection with the processor 202. In some implementations, the memory 204 may include one or more of volatile memory and non-volatile memory. For example, the memory may include, but is not limited to, one or more of a dynamic random access memory (DRAM) device, a static random access memory (SRAM) device, a discrete memory device (e.g., a PROM, FPROM, ROM), a hard disk drive, an optical disk drive (CD, DVD, Blue-ray™, etc.). It should be understood that the memory may be a single device or may include multiple types of devices and configurations.

The bus 206 can include a communication bus for transferring data between components of a server or between computing devices, a network bus system including the network 102 or portions thereof, a processor mesh, a combination thereof, etc. The software communication mechanism can include and/or facilitate, for example, inter-process communication, local function or procedure calls, remote procedure calls, an object broker (e.g., CORBA), direct socket communication (e.g., TCP/IP sockets) among software modules, UDP broadcasts and receipts, HTTP connections, etc. Further, any or all of the communication could be secure (e.g., SSH, HTTPS, etc.).

The communication unit 208 may include one or more interface devices (I/F) for wired and/or wireless connectivity with the network 102. For instance, the communication unit 208 may include, but is not limited to, CAT-type interfaces; wireless transceivers for sending and receiving signals using radio transceivers (4G, 3G, 2G, etc.) for communication with the mobile network, and radio transceivers for Wi-Fi' and close-proximity (e.g., Bluetooth®, NFC, etc.) connectivity, etc.; USB interfaces; various combinations thereof; etc. In some implementations, the communication unit 208 can link the processor 202 to the network 102, which may in turn be coupled to other processing systems or other computing devices 200. The communication unit 208 can provide other connections to the network 102 and to other entities of the system 100 using various standard network communication protocols, including, for example, those discussed elsewhere herein.

As mentioned above, a computing device 200 may include other and/or fewer components. Examples of other components may include a display, an input device, a sensor, etc. (not shown). In one embodiment, the computing device 200 includes a display (not shown). The display may display electronic images and data output by the computing device 200 for presentation to a user. The display may include any conventional display device, monitor or screen, including, for example, an organic light-emitting diode (OLED) display, a liquid crystal display (LCD), etc. In some implementations, the display may be a touch-screen display capable of receiving input from a stylus, one or more fingers of a user, etc. For example, the display may be a capacitive touch-screen display capable of detecting and interpreting multiple points of contact with the display surface.

The input device (not shown) may include any device for inputting information into the computing device 200. In some implementations, the input device may include one or more peripheral devices. For example, the input device may include a keyboard (e.g., a QWERTY keyboard or keyboard in any other language), a pointing device (e.g., a mouse or touchpad), microphone, an image/video capture device (e.g., camera), etc. In some implementations, the input device may include a touch-screen display capable of receiving input from the one or more fingers of the user. For example, the user could interact with an emulated (i.e., virtual or soft) keyboard displayed on the touch-screen display by using fingers to contacting the display in the keyboard regions.

Example Methods

Figure 3:
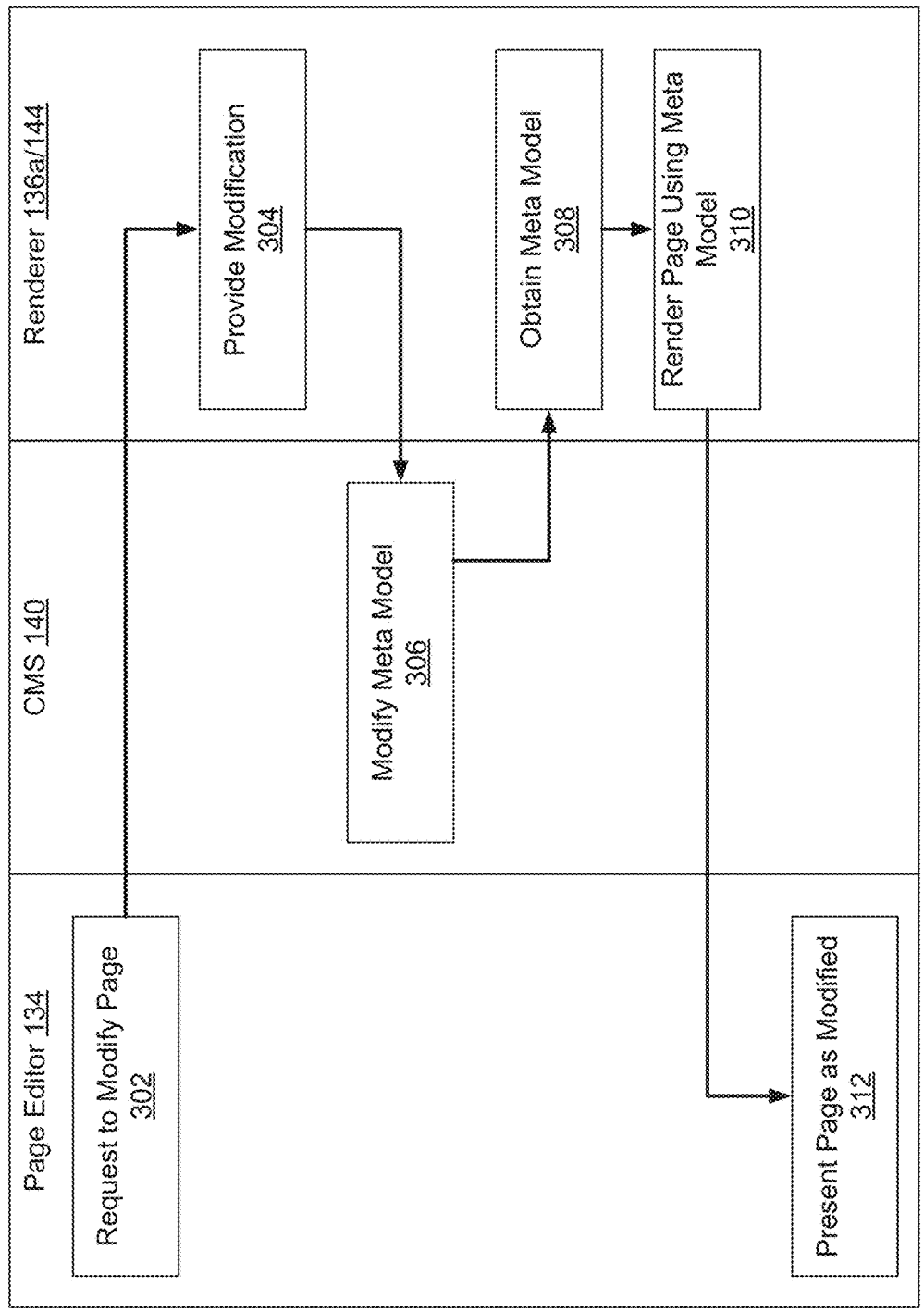
FIG. 3 is a diagram illustrating an example of how components of the technology agnostic page builder interact and some operations that are supported according to one embodiment.
Figure 4:
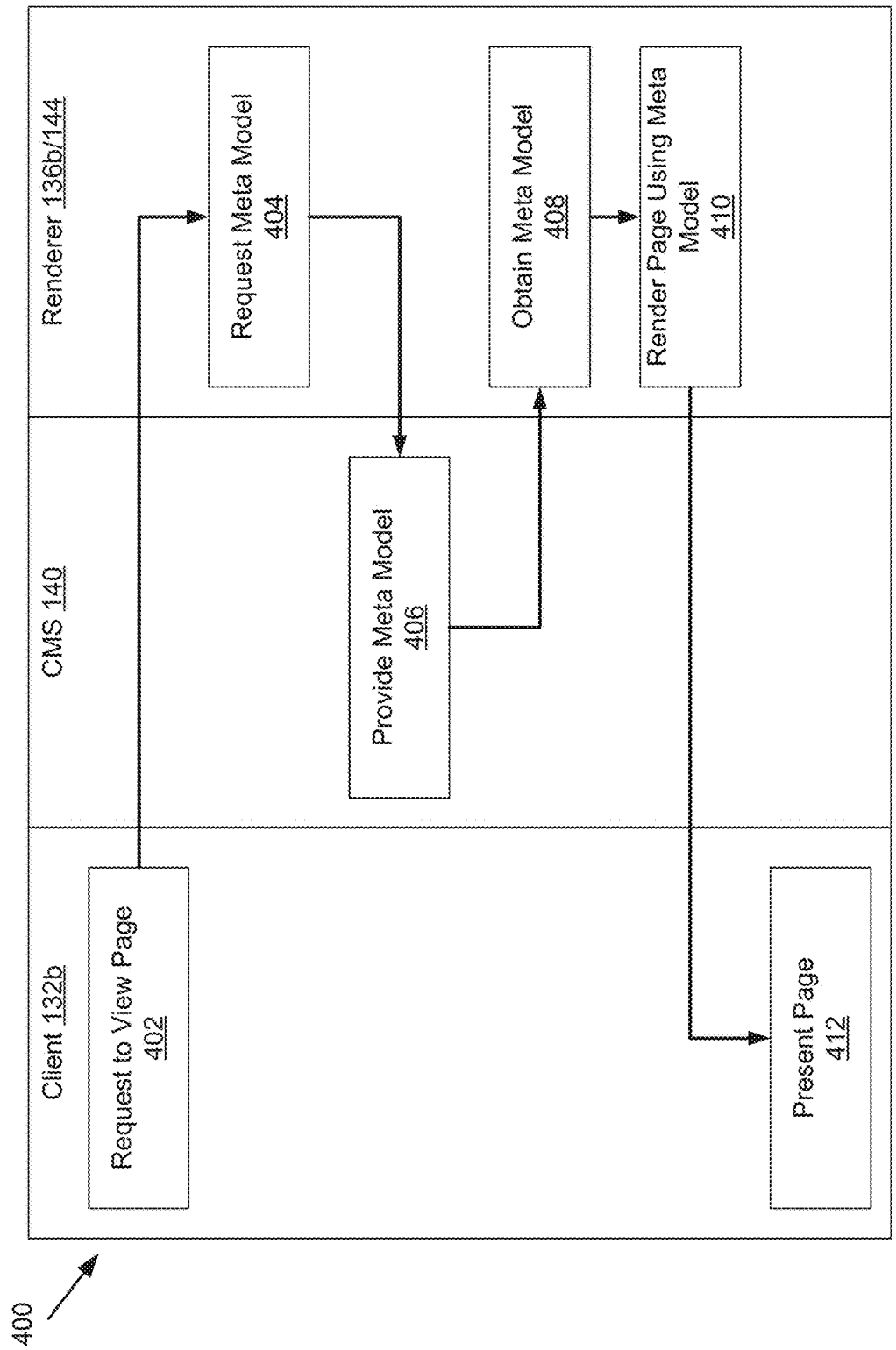
FIG. 4 is a diagram illustrating an example of how components of the technology agnostic page builder interact and some operations that are supported according to one embodiment.

FIGS. 3-5 depict example methods by the system 100 described above in reference to FIGS. 1 and 2 according to some embodiments. However, it should be recognized that the methods described herein are merely examples and that other examples and embodiments exist. For example, embodiments which have more, fewer, or different components and/or reorder a portion of the components are contemplated.

Referring to FIG. 3, an example method 300 illustrating the page editor 134, CMS 140, and renderer 136a or 144 interacting to edit and present a page according to one embodiment. At block 302, the page editor 134 requests to modify a page. For example, the page editor 134 receives user input requesting a modification to the page and sends the request to the renderer(s), whether client-side 136a, server-side 144, or both, associated with the page being edited. The modification requested at block 302 may vary based on the embodiment and use case. Examples include, but are not limited to, creating a new page, modifying (e.g. adding, removing, or changing) content (e.g. text, images, widgets, etc.) or a layout, modifying (adding or removing) a renderer from the set of renderers associated with the page, etc. At block 304, the renderer(s) 136a/144 provide the requested modification to the CMS 140. For example, the renderer(s) 136a/144 make a set of API calls to the CMS 140 and provides the requested modification. At block 306, the CMS modifies the meta model of the page and persists the modification. At block 308, the renderer(s) 136a/144 obtain the meta model, which was modified at block 306, and render, at block 310, the page using the meta model obtained at block 308. While not illustrated, the renderer(s) 136a/144 may obtain content and layout from one or more sources when rendering the page. For example, the renderer(s) 136a/144 may obtain, e.g., text, images, and widgets, from one or more of the CMS 140, a different CMS (not shown), a database (not shown), or other sources. In some embodiments, the renderer(s) 136a/144 used at block 304, 308, and 310 are identified by the system based on one or more of the request, the client 106a from which the request was made, and a domain (e.g. an Angular page and a .Net Core version of a page may be associated with different domains). In some embodiments, the page is associated with a plurality of renderers and may be rendered in parallel by the plurality of renders. While the description herein frequently refers to HTML, the rendered page content may include HTML or any other visual representation, for example, Windows Forms is an example of a desktop development framework or other kind of visual representation on different technologies. At block 312, the page editor 134 receives the rendered page content generated at block 310 presents the page, as modified, to the user 112a via the page editor 134.

Referring to FIG. 4, an example method 400 illustrating the client 132b, CMS 140, and renderer 136b or 144 interact to serve a page to a visitor according to one embodiment. At block 402, the client 132b requests to view a page. For example, the client 132b, such as a browser, receives user input requesting to view the page and sends the request to the renderer(s), whether client-side 136*b*, server-side 144, or both, associated with the page to be viewed. At block 404, the renderer(s) 136*b*/144 requests the meta model of the page to be viewed from the CMS 140. For example, the renderer(s) 136*b*/144 make a set of API calls to the CMS 140 requesting the meta model of the page. At block 406, the CMS provides the meta model to the renderer(s) 136*b*/144. At block 408, the renderer(s) 136*b*/144 obtain the meta model and render, at block 410, the page using the meta model obtained at block 408. While not illustrated, the renderer(s) 136*b*/144 may obtain content and layout from one or more sources when rendering the page. For example, the renderer(s) 136*b*/144 may obtain, e.g., text, images, and widgets, from one or more of the CMS 140, a different CMS (not shown), a database (not shown), or other sources. In some embodiments, the renderer(s) 136*b*/144 used at block 404, 408, and 410 are identified by the system based on one or more of the request, the client 132*b* from which the request was made, and a domain (e.g. an Angular page and a .Net Core version of a page may be associated with different domains). In some embodiments, the page is associated with a plurality of renderers and may be rendered in parallel by the plurality of renders. While the description herein frequently refers to HTML, the rendered page content may include HTML or any other visual representation, for example, Windows Forms is an example of a desktop development framework or other kind of visual representation on different technologies. At block 412, the client 132*b* receives the rendered page content generated at block 410 presents the page, as modified, to the user 112*a* via the page editor 134.

Referring to FIG. 5, an example workflow 500 for technology agnostic page building according to one embodiment is shown. An admin. user 112*a*, via the page editor 134, selects a technology and arranges page elements (e.g. text and/or images). At 510, a request is sent from the page editor 134 to obtain a widget from the renderer(s). At 502, the page, or modification to the page, is sent to the CMS API 142 and persisted in a meta model for the page. At 504, the associated renderer(s) 136*a* and/or 144 obtain the meta model, and render (not shown) the page based on the meta model. The rendered page may then be provided, at 506, to the administrative user in the what you see is what you get UI of the page editor 134.

When a visitor requests (not shown) the page, the renderer(s) 136*b* and/or 144 obtain, at 504, the meta model, and render (not shown) the page based on the meta model. The rendered page may then be provided, at 508, for display to the visitor 112*b*.

Other Considerations

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

Reference in the specification to "one embodiment," "an embodiment," "one implementation" or "an implementation" means that a particular feature, structure, or characteristic described in connection with the embodiment is included in at least one embodiment. The appearances of the phrase "in one embodiment" in various places in the specification are not necessarily all referring to the same embodiment.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes but is not limited to firmware, resident software, microcode, etc.

Furthermore, the technology can take the form of a computer program product accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), Web Socket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats.

Furthermore, the modules, engines, routines, features, attributes, methodologies and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure not limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
obtaining, by a first renderer belonging to a first set of renderers a first meta model representing a renderer-agnostic content and a renderer-agnostic layout of a first page, wherein the first set of renderers is dynamic and identified by a user from a plurality of renderers via an agnostic page editor;
rendering, by the first renderer belonging to the first set of renderers, the first page for presentation using the first meta model; and
sending first rendered content for presentation of the first page via the agnostic page editor.

2. The method of claim 1, the method further comprising:
receiving a first modification request associated with a first page, the first modification request generated by an agnostic page editor responsive to input received from the user, the agnostic page editor compatible with a plurality of renderers from which the user identifies the first set of multiple renderers to be associated with the first page.

3. The method of claim 2, wherein the first modification request includes one or more of:
a request to create the first page,
a request to modify one or more of the renderer-agnostic layout associated with the first page and the renderer-agnostic content associated with the first page, wherein the request to modify the renderer-agnostic content associated with the first page includes:
a modification including one or more of an addition, a removal, and a change, and
the renderer-agnostic content includes one or more of text, an image, and a widget; and
a request to remove a renderer from the first set of renderers.

4. The method of claim 2, wherein the first modification request includes a request to add the first renderer to the first set of renderers.

5. The method of claim 1, the method further comprising:
modifying the first meta model associated with the first page based on a first modification request.

6. The method of claim 1, wherein the first set of renderers associated with the first page includes one or more of a set of client-side renderers and a set of server-side renderers.

7. The method of claim 1, wherein the first set of renderers associated with the first page includes multiple, different renderers, and the first page is rendered for presentation to multiple visitors using the multiple, different renderers in parallel.

8. The method of claim 1, the method further comprising:
receiving a first request to view the first page, the first request to view the first page associated with a visitor;
obtaining the first meta model associated with the first page;
rendering, using a renderer identified from the first set of renderers associated with the first page, the first page for presentation to the visitor based on the first meta model associated with the first page; and
sending second rendered content for presentation to the visitor via a browser.

9. The method of claim 8, wherein one or more of:
a data interchange format used by the first meta model includes JSON;
the first rendered content includes one or more of HTML and Windows Forms data; and
the second rendered content includes one or more of HTML and Windows Forms data.

10. The method of claim 1, the method further comprising:
identifying which renderer, from the first set of renderers, to use to obtain the first meta model and render the first page based on one or more of information associated with a request, information associated with a client from which the request was received, and a domain.

11. A system comprising one or more processors and memory operably coupled with the one or more processors, wherein the memory stores instructions that, in response to execution of the instructions by one or more processors, cause the one or more processors to perform operations including:
obtaining, by a first renderer belonging to a first set of renderers, a first meta model representing a renderer-agnostic content and a renderer-agnostic layout of a first page, wherein the first set of renderers is dynamic and identified by a user from a plurality of renderers via an agnostic page editor;
rendering, by the first renderer belonging to the first set of renderers, the first page for presentation using the first meta model; and
sending first rendered content for presentation of the first page via the agnostic page editor.

12. The system of claim 11, wherein the operations further comprising:
receiving a first modification request associated with a first page, the first modification request generated by an agnostic page editor responsive to input received from the user, the agnostic page editor compatible with a plurality of renderers from which the user identifies the first set of renderers to be associated with the first page.

13. The system of claim 12, wherein the first modification request includes one or more of:
a request to create the first page,
a request to modify one or more of the renderer-agnostic layout associated with the first page and the renderer-agnostic content associated with the first page, wherein the request to modify the renderer-agnostic content associated with the first page includes:
a modification including one or more of an addition, a removal, and a change, and
the renderer-agnostic content includes one or more of text, an image, and a widget; and
a request to remove a renderer from the first set of renderers.

14. The system of claim 12, wherein the first modification request includes a request to add the first renderer to the first set of renderers.

15. The system of claim 11, the operations further comprising:
modifying the first meta model associated with the first page based on a first modification request.

16. The system of claim 11, wherein the first set of renderers associated with the first page includes one or more of a set of client-side renderers and a set of server-side renderers.

17. The system of claim 11, wherein the first set of renderers associated with the first page includes multiple, different renderers, and the first page is rendered for presentation to multiple visitors using the multiple, different renderers in parallel.

18. The system of claim 11, wherein the operations further comprise:
receiving a first request to view the first page, the first request to view the first page associated with a visitor;
obtaining the first meta model associated with the first page;
render, using a renderer identified from the first set of renderers associated with the first page, the first page for presentation to the visitor based on the first meta model associated with the first page; and
sending second rendered content for presentation to the visitor via a browser.

19. The system of claim 18, wherein one or more of:
a data interchange format used by the first meta model includes JSON;
the first rendered content includes one or more of HTML and Windows Forms data; and
the second rendered content includes one or more of HTML and Windows Forms data.

20. The system of claim 11, wherein the operations further comprise:
identifying which renderer, from the first set of renderers, to use to obtain the first meta model and render the first page based on one or more of information associated with a request, information associated with a client from which the request was received, and a domain.

* * * * *